May 5, 1931. H. FORD 1,803,752
GLASS GRINDING MACHINE
Filed Feb. 7, 1930 5 Sheets-Sheet 3

INVENTOR.
Henry Ford.
BY
ATTORNEY.

May 5, 1931.  H. FORD  1,803,752
GLASS GRINDING MACHINE
Filed Feb. 7, 1930  5 Sheets-Sheet 4

INVENTOR.
Henry Ford.
BY
ATTORNEY.

May 5, 1931. H. FORD 1,803,752
GLASS GRINDING MACHINE
Filed Feb. 7, 1930 5 Sheets-Sheet 5

INVENTOR.
Henry Ford.
BY
ATTORNEY.

Patented May 5, 1931

1,803,752

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

GLASS GRINDING MACHINE

Application filed February 7, 1930. Serial No. 426,535.

The object of my invention is to provide a glass grinding machine especially adapted for continuously grinding and polishing the surface of sheet or plate glass. The usual machine for continuously grinding plate glass consists of a moving platform which passes beneath a row of revolving grinding discs. The glass plate is imbedded in plaster on the top of the platform so that as it passes from one disc to the next it is ground and polished. The plate is then removed from the plaster and turned over and is then run beneath like discs to grind and polish the other side of the sheet.

The primary object of my invention is to provide a glass grinding machine which will grind both sides of the sheet of glass simultaneously thereby lessening the time required for grinding and making it unnecessary to imbed the sheet in plaster or the like. It may be readily seen that a great saving in time and material results from this improvement.

Still a further object of my invention is to provide a glass grinding machine in which the sheets of glass are placed on edge and fed between pairs of revolving grinding discs. In this device the pressure of the grinding discs on one side of the glass exactly counterbalances the pressure of the discs on the opposite side so that it is not necessary to support the glass sheet against the grinding pressure except by the discs themselves. This feature of my improved grinding machine makes it unnecessary to imbed the glass sheet in plaster of Paris or the like when one face is being ground. The sheet of glass being totally immersed in the grinding liquid, it is very efficiently cooled so that greater grinding speeds may be safely maintained.

Still a further object of my invention is to provide a glass grinding machine having a plurality of small grinding discs directly operated by individual electric motors. The ordinary method of grinding glass consists in passing the glass sheet beneath a revolving disc, the disc covering the full width of the sheet. Practically all of the actual grinding is done by the outer rim of the grinding disc because the surface speed is the highest at this point and because the grinding compound is thrown outwardly by the disc away from the center. It may thus be seen that in my improved grinding machine where a plurality of small grinding wheels are used a much larger effective grinding area is obtained than if a single large disc were substituted therefor.

Still a further object of my invention is to provide a glass grinding machine in which the sheets of glass are reciprocated vertically while they are traveling between the groups of grinding discs to equalize any difference between the horizontal rows of grinding wheels.

Still a further object of my invention is to provide a glass grinding machine consisting of five grinding units secured together to form a single liquid tight tank and to provide means for letting the glass sheet pass from one unit to the next without an interchange of liquid between the compartments forming each unit. Means are provided for feeding a liquid grinding compound to the first tank from which it flows over suitable dams to each of the successive tanks thereby levigating the grinding compound so that each succeeding grinding unit will produce a smoother finish on the surface of the sheet. Means are also provided for agitating the grinding compound in each unit thereby preventing settling of the heavier particles so that all the discs in each unit will produce the same degree of finish on the sheet of glass.

If desired, other means may be provided for levigating the grinding compound, such as individual supply tanks for each unit, without affecting the working of my device. The glass sheet is, of course, totally immersed in the grinding compound so that all portions of the sheets are subject to the same grinding action thereby providing a more uniform ground surface.

A further improved feature in connection with this device consists in the novel type of grinding disc which acts as a centrifugal pump supplying grinding compound to the entire grinding face of the disc. This is accomplished without boring the driving shaft or the use of packing glands or the like.

With these and other objects in view my invention consists in the arrangement, construction, and combination of the various parts of my improved device, as described in the specification, claimed in my claims, and illustrated in the accompanying drawings, in which:

Figure 5:
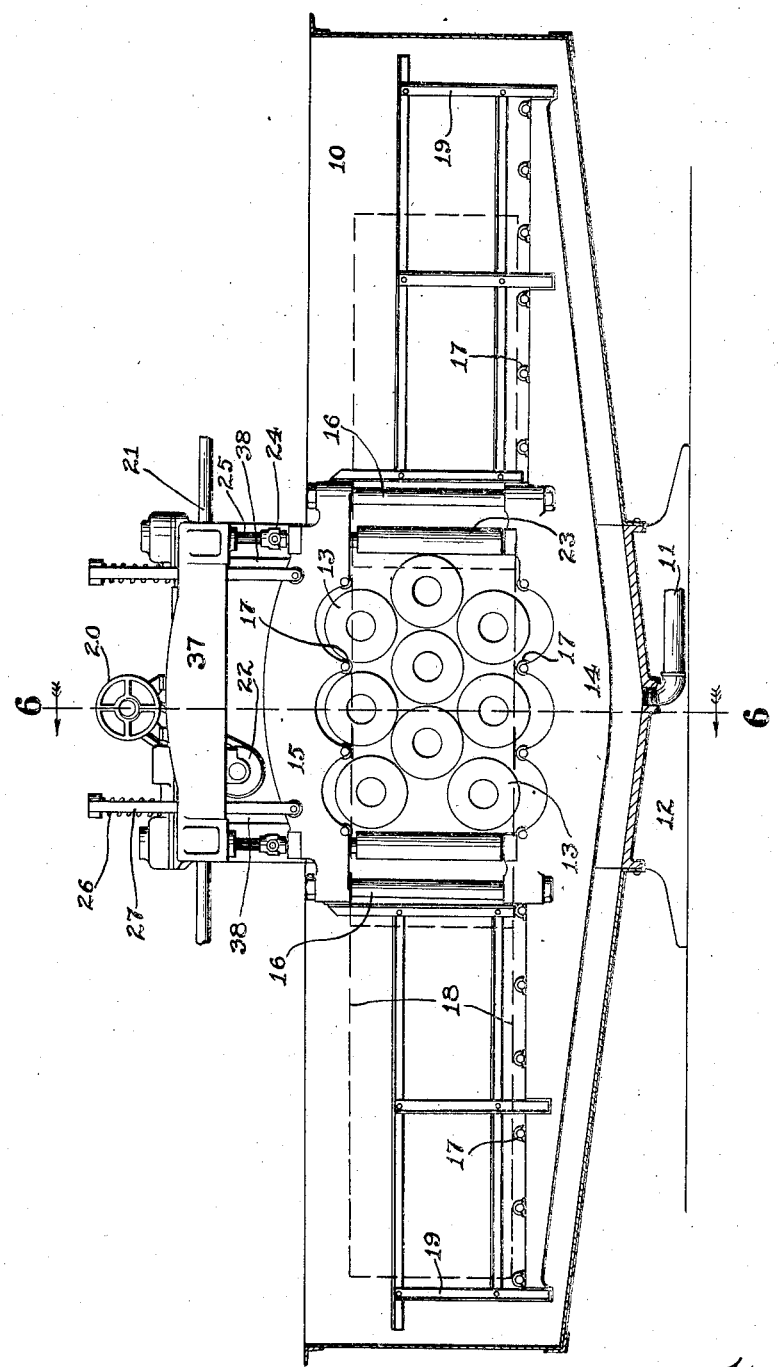
Figure 5 shows a side elevation of an alternate glass grinding machine which accomplishes only one grinding operation. A plurality of these machines are successively used to completely grind and polish the sheet of glass.
Figure 6:
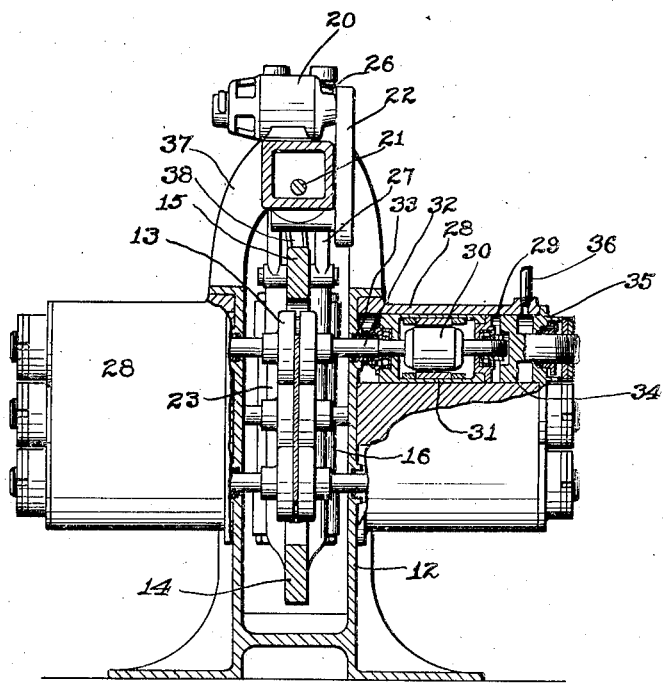
Figure 6 shows a sectional view taken on the line 6—6 of Figure 5.

As has been stated two adoptions of my improved machine are here illustrated and I will first describe the single operation machine, illustrated in Figures 5 and 6, and will then take up the description of my preferable device shown in the remaining views.

Referring to Figures 5 and 6, I have provided a rectangular shaped tank having its bottom portion sloping toward the center so that liquid therein will flow out through a drain fitting 11. This tank is formed from sheet metal sections 10 which are bolted to the main frame of the grinding machine. The grinding machine proper consists of a U-shaped frame member 12 the legs of the frame forming the sides of the tank. A plurality of cast iron grinding discs 13 extend through these legs and are driven by suitable electric motors.

In the form of device here shown, a bracket 28 used to support the driving motors is bolted to the outside of each frame leg 12 and these brackets are each provided with a plurality of bores 29 arranged to house these grinding disc motors. These motors consists of armatures 30, housings 31, and driving shafts 32. The grinding discs 13 are secured directly to the inner ends of the shafts 32 within the tank portion of the machine. Suitable packing glands 33 are disposed around these shafts to prevent liquid in the tank from entering the driving motors.

The motor housings 31 are slidably mounted in the bores 29 and plungers 34 also slidably mounted in the bores 29 bear against the rear ends of these motors. A cylinder head 35 is secured over the outer end of each of these bores. An oil pipe 36 discharges into the space between the plunger and head to hydraulically feed the plunger, motor, and grinding discs.

The sheet of glass to be ground is placed between the opposite grinding discs and oil under pressure forces all of the discs against this sheet. There are the same number of discs on each side of the glass sheet so that the pressure produced by one group of discs is exactly counterbalanced by the pressure of the opposite groups. Thus the sheet of glass may be fed between these discs and both sides will be ground simultaneously.

The means for supporting and feeding the sheet of glass between the grinding discs consists of a cradle member 14 suspended in the tank portion of the machine. The member 14 extends outwardly and adjacent to the extreme end of the tank so that loading and unloading platforms may be formed for the glass sheets. A plurality of rollers 17 are pivoted to the upper face of the member 14 so that the sheet may rest on these rollers as shown by dotted lines 18. Angle iron guide members 19 are provided to hold the glass in a vertical position while it is being fed to the grinding discs. A cradle top 15 is secured to the member 14 by means of four tie bolts and are likewise provided with rollers 17 to guide the upper edge of the glass. Suitable guide members are secured to the frame 12 which co-act with the tie bolts 16 thereby guiding the cradle member and permitting only vertical reciprocation thereof.

A bracket member 37 is arranged to straddle the upper portion of the tank and is provided with means mounted therein for reciprocating the cradle 14. This means consists of an electric motor 20 which drives a longitudinally extending shaft 21 through suitable gearing 22. A pair of crank arms, not shown in the drawings, are provided on the shaft 21 and connecting rods 38 connect these crank arms with the top member 15 so that when the shaft 21 is rotated the cradle member 14 will be reciprocated in a vertical path.

A pair of vertically extending rubber rollers 23 are rotatably mounted beneath the ends of the members 14 and 15 and are driven from the shaft 21 through universal joints 24, spline shafts 25, and suitable gearing disposed in the brackets 37.

A pair of counterbalancing springs 26 bear against the upper portions of the brackets 12 and urge rods 27 which extend from each corner of the member 15 so that the entire cradle member will be spring counterbalanced to lessen the load on the motor 20 when reciprocating same.

The operation of the device consists in first filling the tank with grinding solution, then placing the sheet of glass to be ground on the rollers at one end of the member 14. The motor 20 together with the grinding disc motors are then started. The rollers 23 thereby feed the sheet of glass between the two groups of grinding discs 13 so that when the glass sheet has travelled to the opposite end of the machine one of the grinding operations has been performed. To finish grinding and polishing a sheet of glass it is, of course, necessary to successively grind the glass with finer grinding compounds so that a number of these machines must be used successively on each sheet of glass. It has been found that about five or six of these machines operating together will produce sufficiently small steps to obtain a highly polished surface on the sheet of glass.

Referring to the remaining figures of the drawings, another form of my improved machine is shown. This device consists of five individual grinding units which are bolted together to form one long tank through which the sheet of glass is fed thereby successively performing all of the grinding operations without removal of the sheet of glass from the tank. The section of the grinding tank formed by each unit consists of a pair of upright side members 39 which are secured together at the bottom and which are provided with flanged ends 40 so that the units may be bolted together to form one long channel shaped tank.

A pair of motor bracket castings 41 are bolted to the outer faces of the side members 39 and a plurality of bores 53 are provided therein to slidably receive electric motors 42. Each of these motors consists of an armature 43 rotatably mounted between end caps 44. A motor shaft 45 extends inwardly from each of the armatures 43 through a packing gland 46 secured to the side member 39 into the tank proper. Grinding discs 54 are fastened to the inner ends of these shafts in position to bear against the sides of the glass sheet which is to be ground. A hydraulic piston 47 is secured to the rear end of the motor by means of a bolt 48 and a cylinder head 49 is secured over the outer end of each of the bores 41 so that oil may be fed under pressure to force the motor unit and grinding disc into contact with the glass sheet. Retraction springs 50 are arranged to counteract the oil pressure so that when this pressure is relieved the grinding discs will be urged out of contact with the glass sheet.

Figure 1:
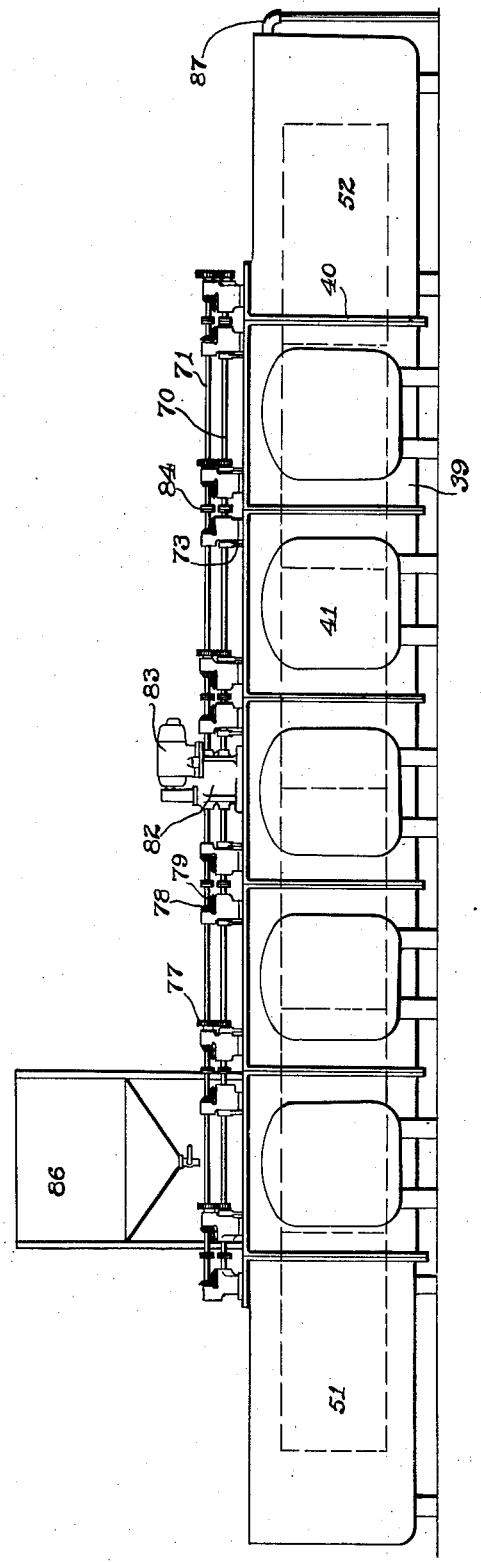
Figure 1 shows a side elevation of my improved grinding machine consisting of five grinding units bolted together.

Referring to Figure 1, five of the unit grinding machines to which I have given the reference numeral 39 are bolted together end to end to form a water tight tank. A charging tank 51 and discharge tank 52 are secured to the respective ends of this assembly so that a single tank is formed.

Figure 4:
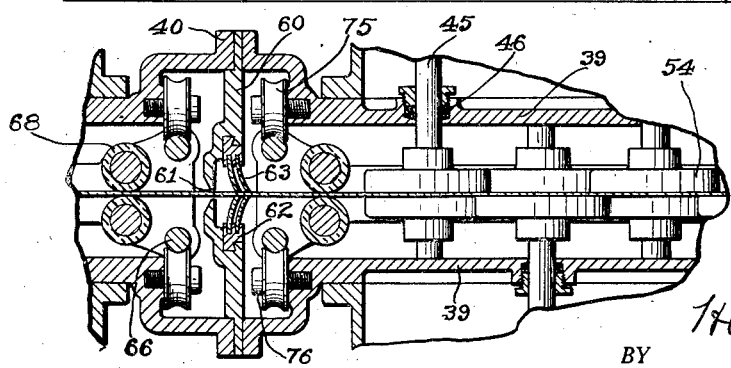
Figure 4 shows a sectional view taken on the line 5—5 of Figure 2.

Means are shown in Figure 4 for allowing the glass sheet to pass from one grinding unit to the next without permitting an interchange of grinding compound between the tanks. A plate 60 is interposed between each pair of flanges 40 which is provided with a central vertical slot 61 through which the glass sheet may slide. A pair of bars 62 are secured by means of a conventional dovetailed joint to the plate 60 on either side of the glass sheet and a pair of rubber blades 63 are fastened in each bar in position to bear against the side of the sheet of glass. I am thus able to obtain a practically water tight joint between the two tanks and still allow the glass sheet to pass from one tank to the other during the grinding operations.

Figure 2:
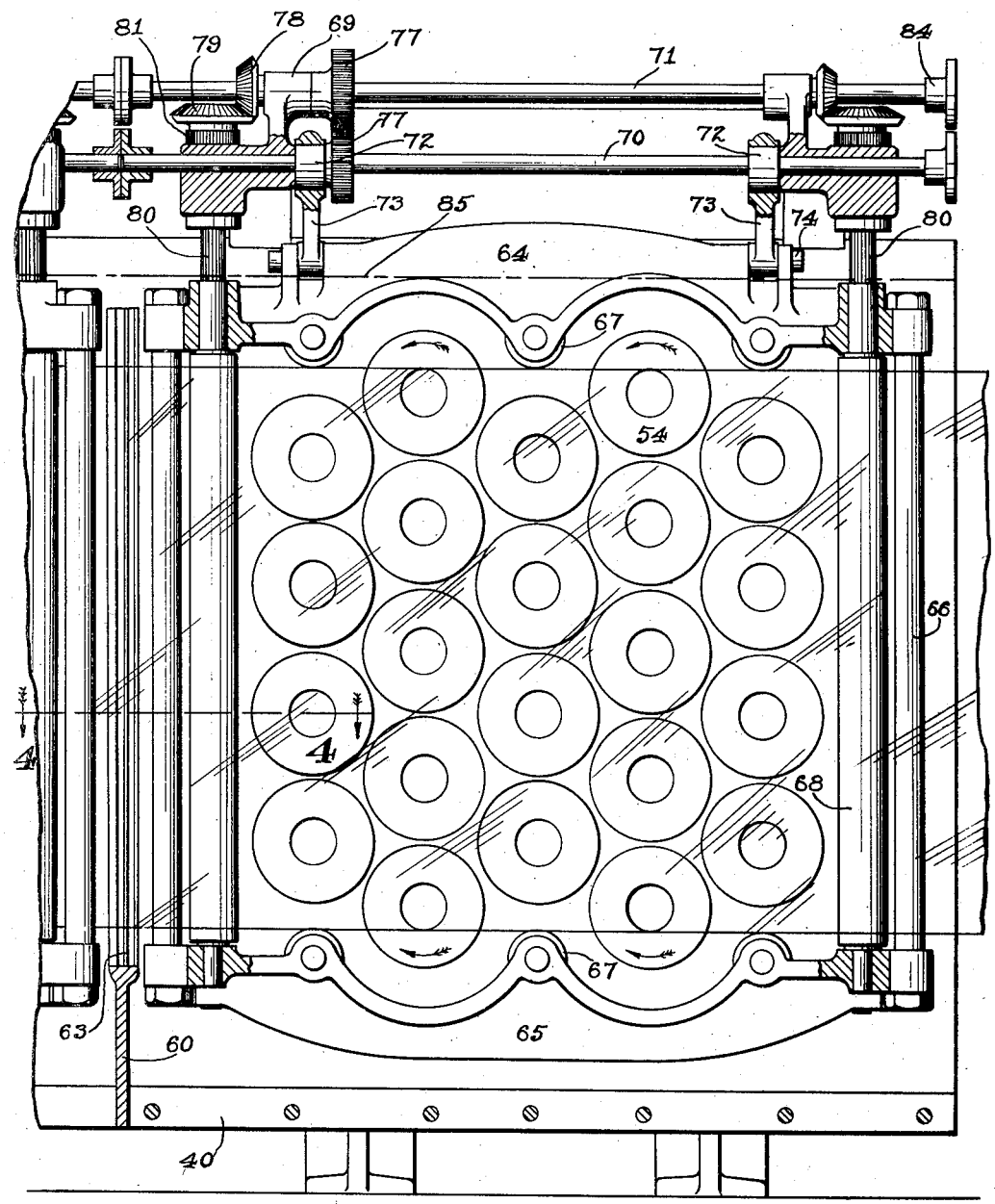
Figure 2 shows a vertical, central, sectional view taken through one of the grinding units of the machine shown in Figure 1.
Figure 3:
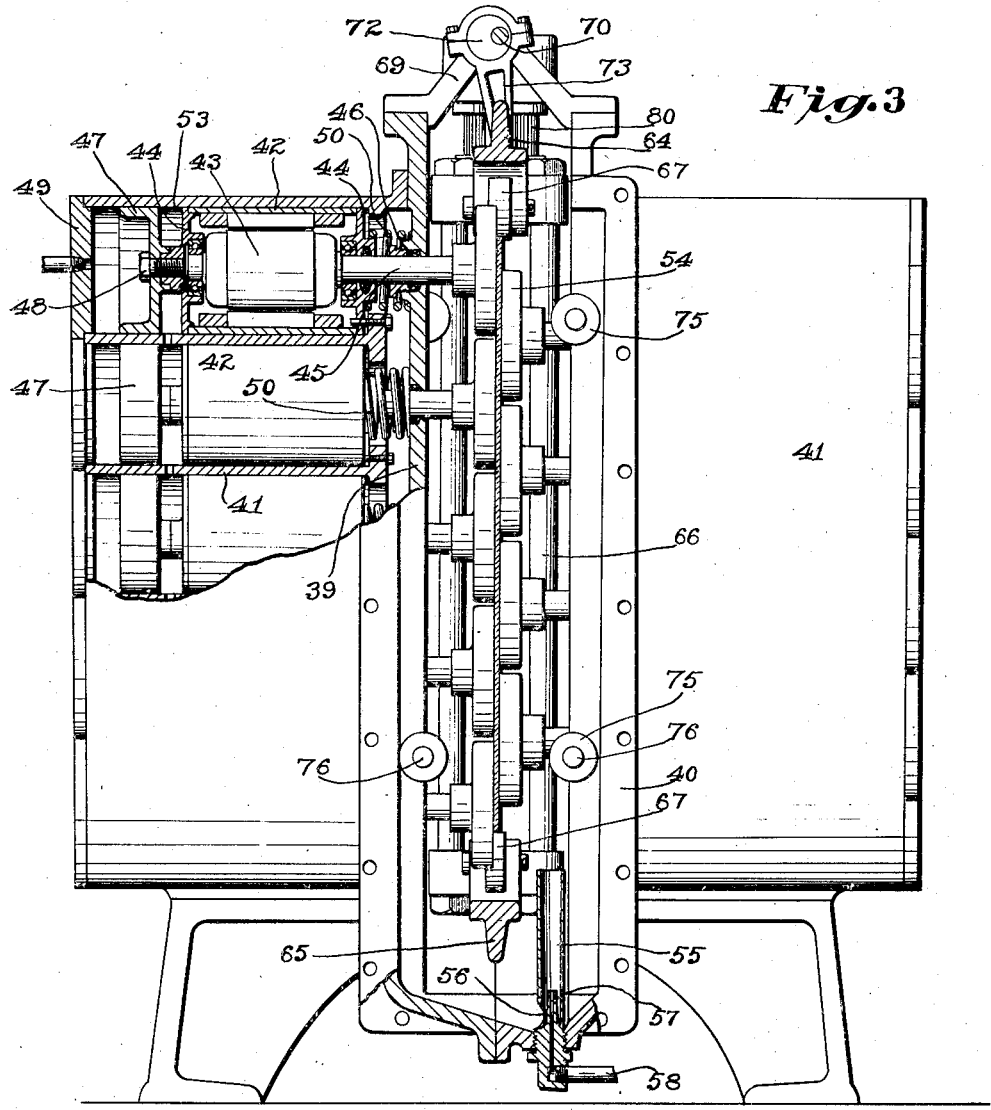
Figure 3 shows an end elevation of one of the grinding units shown in Figure 1, part of the motor housings being sectioned to better illustrate the construction.

Referring to Figures 2 and 3, means are shown for reciprocating the glass sheet in a vertical plane while it is being fed lengthwise through the machine. A glass carrier consisting of upper and lower beams 64 and 65, respectively, are tied together by four tie rods 66 and are provided with a plurality of rollers 67 on their inner faces upon which the glass sheet may roll. A pair of rubber covered feeding rollers 68 are rotatably mounted in a vertical position at each end of the beams so that they may contact with each side of the glass sheet. Thus, when the rollers 68 are operated the sheet is forced lengthwise between the grinding discs 54.

A pair of brackets 69 are arranged to straddle the upper edges of the tank member over each unit and a pair of shafts 70 and 71 are rotatably mounted lengthwise between these brackets. The shaft 70 is disposed directly above the sheet of glass and is provided with a pair of eccentric cams 72 upon which connecting rods 73 are mounted. The lower ends of these rods are pivoted by a pin 74 to the beam 64 so that when the shaft 70 is rotated the carrier members 64 and 65 will be reciprocated in a vertical plane in the grinding tank. Guide rollers 75 rotatably secured on pins 76 to each end of each grinding unit bear against the tie rods 66 to insure vertical movement of this carrier assembly.

A pair of spur gears 77 operatively connect the shafts 70 and 71 and a bevel pinion 78 is secured to the shaft 71 and meshes with a bevel gear 79 which is rotatably mounted in the bracket 69 directly over one of the feeding rollers 68 so that when the shaft 70 is rotated the shaft 71 and gear 79 will also be rotated. A splined extension 80 is provided on the upper end of each of the rollers 68, two of these splines co-act with suitably splined bores in each of the gears 79 so that a driving connection may be had between the shaft 70 and two of the rollers 68. The two rollers on the opposite side of the glass are also provided with splines 80 which co-act with splined couplings rotatably mounted in the brackets 69 directly thereabove. Spur gears 81 secured to the lower face of the gear 79 and to this coupling mesh with each other so that all of the rollers 68 may be driven by the shaft 70.

When individual grinding units are secured together, coupling members 84 are fastened on the adjacent ends of the shafts 70 and 71 so that in effect two continuous shafts extending the length of the machine are provided. A suitable gear housing 82 is secured preferably above the center grinding unit and a motor 83 is fastened thereon and drives the shaft 70 through the gearing therein. Thus, when the motor 83 is in operation the shafts 70 and 71 are rotated, the shaft 70 reciprocating the glass carrier member while the shaft 71 drives the feeding rollers 68 to feed the glass lengthwise through the tank.

Means for agitating the grinding compound in each of the tanks is shown in Figure 3 and consists of a pipe 55 extending into the bottom of the tank member in a vertical position. An opening 56 is provided in the pipe 55 adjacent to the bottom of the tank and an air-nozzle 57 is arranged to discharge air up through the pipe 55. Compressed air for operating this nozzle is provided from an air feeding pipe 58. When the device is in operation the liquid grinding compound enters through the opening 56 and is forced up through the pipe 55 by the well known injector action so that the grinding liquid is constantly agitated to prevent the heavier particles from settling out.

Referring to Figure 2, the top edge of each of the plates 60 is somewhat below the normal level of the grinding compound in the tank. This level is shown by the dotted line 85. The compound is thus permitted to flow from one unit to the next over the top edges of these plates. I have provided a tank 86 supported above the first grinding unit which holds a supply of grinding compound for use in the device and means are provided for allowing this compound to flow down over the grinding discs in the first unit. This compound is, of course, very coarse as only rough grinding is accomplished in the first unit.

As the grinding operations continue these coarse particles of grinding compound are worn down so that the liquid flowing over the top edge of the plate 60 is composed of somewhat finer particles. These finer particles are likewise reduced in size by the grinding action carried on in this unit so that the particles flowing over the plate between the second and third units are still smaller in size. This levigating action is carried on between each of the tanks so that the compound in the last tank is of the finest size for finish grinding. The degree of fineness can be controlled by the amount of coarse compound admitted into the first tank. An overflow pipe 87 extends into the last tank to allow the spent compound to be discharged.

Other means may be provided for levigating the compound between the tanks, such as providing individual tanks adjacent to each of the grinding units and allowing the compound to flow from each of these tanks directly on the grinding discs in the respective unit. Suitable pumps may be provided for returning the grinding compound to the tanks so that it may be used over and over again. When such an apparatus is provided overflow-pipes are usually provided between the supply tanks to carry on the levigation action.

Figures 7, 8:
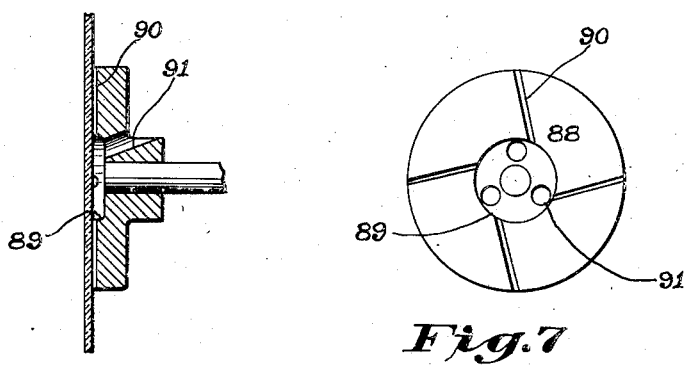
Figure 7 shows a front view of a type of grinding disc which may be desirable for use with my improved grinding machine.
Figure 8 shows a central sectional view through the disc shown in Figure 7.

Referring to Figures 7 and 8, I have shown a type of grinding disc 88 which may be desirable for use. This disc is provided with a relieved center portion 89 and a plurality of radial extending grooves 90 formed in its face. Supply openings 91 extend from the rear of the disc to the relieved center portion 89 so that when the disc is rotated under water it forms in effect a centrifugal pump, drawing the liquid in through the opening 91 and discharging it through the grooves 90. Grinding compound may thus be supplied to the whole face of the disc without need of boring the driving shaft, providing packing glands, and other complicated apparatus formerly thought necessary when supplying compound to the center of the grinding discs.

Among the many advantages arising from the use of my improved device, it may be well to mention that I have provided a machine which grinds both sides of the glass sheet simultaneously and dispenses with the old practice of imbedding the sheet in plaster. A great saving in time and material results from this feature alone.

Further, I have provided means for both feeding and reciprocating the glass while it is being ground to equalize any differences in grinding produced by the various rows of grinding discs. The use of a plurality of small grinding discs provides a more compact machine than has heretofore been thought possible.

A further advantage arises because the glass sheet to be ground is totally immersed in water thereby uniformly supplying grinding compound over its full face and providing cooling for the glass which was impossible to obtain by the older methods of grinding. A greater speed for grinding is thus safely maintained.

My improved method of providing levigation of the grinding compound totally within the grinding machine is also very desirable as it eliminates all outside pumps and levigation tanks thereby simplifying the device.

Some changes may be made in the arrangement, construction, and combination of the various parts of my improved device without departing from the spirit of my invention and, it is my intention to cover by my claims such changes as may reasonably be included within the scope thereof.

I claim as my invention:

1. In a glass grinding machine, means for conveying a sheet of glass on edge between opposed grinding discs to thereby grind both faces of the sheet simultaneously, and means for submerging said sheet in a cooling liquid during the grinding operation.

2. In a glass grinding machine, a tank containing liquid grinding compound, means for conveying a submerged sheet of glass on edge through said tank, and opposed grinding discs submerged in said tank in position to grind both faces of said sheet simultaneously.

3. In a glass grinding machine, means for conveying a sheet of glass on edge longitudinally between opposed grinding discs to thereby grind both faces of the sheet simultaneously, and means for vertically reciprocating said sheet while it is being thus conveyed.

4. In a glass grinding machine, a tank, means for conveying a sheet of glass on edge through said tank, and a plurality of grinding discs within said tank arranged to contact with each side of said sheet, the grinding discs on opposite sides of the sheet being staggered to better distribute the heat produced by the grinding operation.

5. In a glass grinding machine, a tank containing fluid grinding compound, means for supporting a sheet of glass in said liquid, and opposed grinding discs adapted to operate on the surface of the glass beneath the surface of the liquid to grind both faces of the glass sheet simultaneously.

6. A glass grinding machine comprising several tanks secured end to end, opposed discs in each of said tanks, liquid grinding compound in each of said tanks, plate members disposed between each of said tanks arranged to substantially prevent the comingling of the liquid between the several tanks, vertical slots in said plates, and means for conveying a sheet of glass on edge through said slots and between said discs to thereby grind both faces of said sheet simultaneously.

7. In a glass grinding machine, means for supporting a sheet of glass on edge therein, and a plurality of rotating opposed grinding discs arranged to co-act with each side of said sheet, the discs overlapping the edges of said sheet and rotating in a direction to move the sheet longitudinally therebetween.

January 29, 1930.

HENRY FORD.